United States Patent [19]

Marchin et al.

[11] Patent Number: 5,464,603
[45] Date of Patent: Nov. 7, 1995

[54] METHOD OF TREATING AQUEOUS IODIDE SOLUTIONS

[75] Inventors: George L. Marchin; Jack L. Lambert, both of Manhattan, Kans.

[73] Assignee: Kansas State University Research Foundation, Manhattan, Kans.

[21] Appl. No.: 303,322

[22] Filed: Sep. 9, 1994

Related U.S. Application Data

[63] Continuation-in-part of Ser. No. 187,176, Jan. 25, 1994, Pat. No. 5,367,031.

[51] Int. Cl.$^6$ .................................. C01B 7/14; C02F 1/28
[52] U.S. Cl. ........................ 423/501; 423/500; 210/659; 210/673
[58] Field of Search ................................ 210/668, 759, 210/673; 423/181, 500, 501

[56] References Cited

U.S. PATENT DOCUMENTS

| | | | |
|---|---|---|---|
| 3,316,173 | 4/1967 | Mills et al. | 210/683 |
| 3,462,363 | 8/1969 | Mills et al. | 210/668 |
| 3,817,860 | 6/1974 | Lambert et al. | 210/501 |
| 3,914,388 | 10/1975 | Cathers et al. | 423/500 |
| 3,923,665 | 12/1975 | Lambert et al. | 210/501 |
| 4,137,183 | 1/1979 | Caspari | 252/32.7 E |
| 4,190,529 | 2/1980 | Hatch | 210/668 |
| 4,238,477 | 12/1980 | Lambert et al. | 210/501 |
| 4,808,385 | 2/1986 | Grinstead | 423/226 |
| 4,971,729 | 11/1990 | White | 423/181 |
| 4,999,190 | 3/1991 | Fina et al. | 424/78.12 |
| 5,356,611 | 10/1994 | Herkelmann et al. | 423/500 |

OTHER PUBLICATIONS

Grantz et al., "Studies on homogeneously precipitated . . . polyvalent cations", J. of Physical Chemistry, vol. 61, pp. 112–113 (1957 No Month),
Hatch et al., *Ind. Eng. Chem. Prod. Res. Dev.* 19:259–263 (1980).
Fina et al., *Appl. Environ. Microbiol.* (Dec. 1982) 44:1370–1373.
Marchin et al., *Appl. Environ. Microbial.* (Nov. 1983) 46:965–969.
Lambert et al., *Ind. Eng. Chem. Prod. Res. Dev.* 19:256–258 (1980).

*Primary Examiner*—Gary P. Straub
*Assistant Examiner*—N. M. Nguyen
*Attorney, Agent, or Firm*—Tilton, Fallon, Lungmus & Chestnut

[57] ABSTRACT

A method is provided for removing iodide from aqueous solutions in which the iodide is converted to iodine. The porous granules of the polyvalent metal chelating resin containing zirconium peroxide bound to the chelating groups thereof is contacted with the aqueous iodide solution. The iodine is formed within the granules and retained therein, permitting the aqueous solution to be separated to create iodine. This iodine can be recovered by organic solvent elution. The oxidative capacity of the resin granules has been reduced, it can be regenerated after removal of the obtained iodine by contacting the resin granules with aqueous hydrogen peroxide.

5 Claims, No Drawings

METHOD OF TREATING AQUEOUS IODIDE SOLUTIONS

RELATED APPLICATION

This application is a continuation-in-part of application Ser. No. 08/187,176, filed Jan. 25, 1994, now U.S. Pat. No. 5,367,031.

FIELD OF INVENTION

The field of this invention is the removal of iodide from water. The invention is particularly concerned with water treating substances which adsorb or convert iodide in drinking water. The invention also has application in the production of iodine from iodide-containing brine-well waters.

BACKGROUND OF INVENTION

When halogen had been used to disinfect water, it has been proposed to scavenge the residual halogen by a secondary resin treatment. For example, as disclosed is U.S. Pat. No. 3,316,173, water may be treated with bromine released from a strong base anion exchange resin. The bromine eluted from the resin in the treated water can be scavenged as described in U.S. Pat. No. 3,462,363 through use of a scavenger resin in tandem with the bromine-providing resin.

It is known that peroxides of polyvalent metals such as zirconium, titanium, lanthanium, and thorium can oxidize iodide in aqueous solution to elemental iodine: Gantz and Lambert, *J. Phys. Chem.* (1957) 61:112-113. These authors reported that zirconium peroxide can be formed from zirconyl ion attached to filter paper or starch. Zirconyl ion solutions were found to react irreversibly with cellulose. It was hypothesized that this was the result of the attachment of the zirconyl ion through hydroxy groups of the glucose units. After attachment of the zirconyl ions, treatment of the filter paper with hydrogen peroxide produced zirconyl peroxide which remained attached to the paper.

SUMMARY OF INVENTION

This invention is based in part on the discovery of a novel water treating resin which is capable of oxidizing iodide to iodine and also of retaining the formed iodine. The composition comprises porous granules of a metal chelating resin which provide functional groups capable of binding polyvalent metal ions. The granules are prepared so that they contain strongly bonded zirconium peroxide. When water containing iodide is contacted with the resin, iodide is oxidized within the granules to form iodine. The iodine thus formed tends to be retained within the granules. Treated water can be produced which is essentially free of both iodide and iodine.

This invention also involves a method of treating water with the oxidizing resin described above. This method can be used for treating water which has been disinfected by being contacted with a polyiodide anion exchange resin, which results in the release of iodide ions in the treated water. The iodide-containing water is contacted with the zirconium peroxide containing chelated resin granules. The oxidizing action of the zirconium peroxide converts the iodide to iodine which is retained within the granules. By separation of the treated water from the granules, disinfected water is produced which is free of both iodide and iodine.

In preferred embodiments of the oxidizing resin of this invention, the zirconium is so strongly held that it can be repeatedly regenerated while remaining attached to the resin. The oxidative capacity of the resin can be restored by treating the resin with hydrogen peroxide, thereby making it possible to repeatedly regenerate the resin after its oxidizing capacity has been exhausted. This is an important and surprising feature of the present invention. In another application of the present invention, low concentrations of iodide in brine waters can be converted to iodine which becomes trapped in the resin matrix. Upon becoming saturated with the iodine, it can be eluted by an organic solvent such as acetone.

DETAILED DISCLOSURE

To prepare the zirconium peroxide-containing resin of this invention, a polyvalent metal ion chelating resin is employed. For example, a gel-type or macroporous-type chelating resin containing alkylaminophosphonic chelating groups can be used. Bio-Rad Laboratories, Richmond, Calif. sells chelating resins which are polystyrene divinyl benzene copolymers containing iminodiacetic acid functional groups. These resins are identified as "Chelex 20" (macroporous form) and "Chelex 100" (gel form). The gel form of the Chelex resin is preferred for the purposes of this invention. Chelex 100 is available in analytical and biotechnology grades which are suitable for use in this invention. Chelex 20 is a technical grade resin which can also be used. Other metal-chelating resins which bind multi-valent metal cations are described in U.S. Pat. No. 4,895,905. The resins may contain different chelating functionalities. For purpose of the present invention, the chelating resins preferably contain iminodiacetic acid functional groups.

A suitable reagent for use in preparing the resin is zirconyl chloride, which is available commercially in hydrate form, such as zirconyl chloride heptahydrate or octahydrate. The zirconyl chloride hydrates are soluble in water and partially soluble in alcohols such as methanol. With either the alcohol or aqueous method, it has been found important to first convert the dissolved zirconyl chloride to zirconium peroxide before contacting the solution with the chelating resin. This sequence produces a much more oxidative product. The desired sequence is in contrast to the previously described procedure of Gantz and Lambert (1957), cited above, in which the zirconium ion is bonded to filter paper or starch and thereafter converted to the peroxide. That procedure has not been found to be satisfactory for preparing the zirconium resin of this invention.

For example, an alcohol solution (or dispersion) of zirconyl chloride is prepared. Next hydrogen peroxide is added to produce a solution of zirconyl peroxide. That solution is then applied to the resin granules to form the oxidative resin. Methanol is the preferred solvent but other lower alcohols can be used, such as ethanol or isopropanol. Using methanol tends to somewhat improve the oxidative capacity of the resin.

In the alcohol solution procedure, a chelating resin, such as Chelex 20 or Chelex 100, is prepared by being suspended in the same lower alcohol, such as anhydrous methanol. The resin can be washed several times with the anhydrous alcohol to remove any water present. During this pretreatment, the resin granules will shrink. When the zirconyl chloride hydrate is suspended in the anhydrous alcohol, complete solution may not occur, the zirconyl chloride being partially in the form of a dispersion. When the hydrogen peroxide is added to the zirconyl chloride hydrate-alcohol suspension, reaction heat is generated and complete solution will usually occur. This can be visualized by the clearing of the cloudy suspension. The resulting solution of zirconyl peroxide is added to the alcohol suspension of the Chelex resin. This results in swelling of the resin granules. To assure completeness of reaction, these reactants may be mixed for 0.5 to 1.5 hours. The resin granules may then be allowed to settle out of the treating solution. The supernatant solution can be poured off, and the resin can be purified by repeated washing with distilled water. During such water washing, the resin granules will again shrink in volume.

With the preferred procedure as described, it appears that the gel matrix of the resin granules is maintained. When an aqueous treating procedure is used, however, it appears that the gel matrix partially collapses. This inhibits the most efficient binding of the zirconyl peroxide to the iminodiacetate groups. An oxidizing resin prepared by the aqueous method has substantially less oxidative capacity than the resin prepared by impregnation with a methanol solution of zirconyl peroxide.

Zirconium peroxide chelating resins prepared as described can be used for treating water containing iodide salts. On being contacted with the bound zirconium peroxide within the resin granules, the iodide ions are converted to iodine. As this conversion proceeds, the formed iodine is largely retained within the granules. This can be observed by a change of color of the granules.

An alternate use of the resin of this invention is to produce iodine. The iodine collected within the resin granules can be removed by a suitable elution procedure. In a primary proposed application, however, the zirconium peroxide-containing chelating resin is used as secondary treatment for drinking water, which has been contacted with a polyiodide disinfecting resin. Even if the polyiodide resin is used in conjunction with an iodine scavenging material, such as granulated activated carbon, or an anion exchange resin, over time these iodine scavenging materials will tend to reduce iodine to iodide, and thus result in an iodide residual in the treated water. By subsequently treating the water with the zirconium peroxide resin of this invention, both iodide and iodine can be effectively removed. This invention in one of its embodiments can therefore be used as a combination treatment.

Polyiodide anion exchange resins for use in this combination treatment can be prepared in accordance with known procedures, and commercially available strong base anion exchange resins can be used. Such resins are available in the form of granules or beads prepared for ion exchange use, and are typically provided in a chloride or sulfate form. The resin is commonly obtained or converted to the chloride form and then converted to a polyiodide form. Quaternary ammonium anion exchange resins are preferred, such as those described in U.S. Pat. No. 4,999,190. However, other strong base anion exchange resins can be employed such as tertiary sulfonium resins, quaternary phosphonium resins, and alkylpyridinium resins.

The strong base anion exchange resin in the chloride form can be treated with a solution of potassium triiodide, as described in U.S. Pat. No. 3,817,860, to produce a triiodide resin. Triiodide and pentaiodide resins, containing primarily triiodide can be prepared as described in U.S. Pat. No. 4,137,183. Other polyiodide resins containing selected amounts of triiodide, pentaiodide or higher polyiodides can be prepared as described in U.S. Pat. No. 4,238,477. Preferably, the polyiodide resin is prepared as described in U.S. Pat. No. 4,999,190. Such resins contain more than fifty percent pentaiodide ($I_5^-$) together with a lesser proportion of triiodide ($I_3^-$). In preferred embodiments, a quaternary ammonium anion exchange resin is prepared containing more than sixty percent pentaiodide. The exact procedure for producing this kind of resin is set out in U.S. Pat. No. 4,999,190, and that procedure is incorporated herein by reference.

The present invention is further illustrated in preferred embodiments by the following examples.

EXAMPLE I

Preparation of Zirconium Peroxide Resin

The zirconium peroxide resin can be efficiently prepared in the following manner. A commercially available iminodiacetate resin in either the gel or macroporous form (100 ml; 0.40 meq per ml; Chelex 20 or Chelex 100) is suspended in anhydrous methanol and washed several times with anhydrous methanol to remove water. During this resuspension of the volume of the resin shrinks to approximately 35 ml. In another container zirconyl chloride heptahydrate (12.5 gm) is suspended in anhydrous methanol (100 ml.). Complete solution does not occur and the suspension remains cloudy. hydrogen peroxide (30%, 20 ml.) is added to the zirconyl chloride heptahydrate-methanol suspension to produce the zirconyl peroxide. During this reaction heat is liberated and complete solution occurs as visualized by clearing of the cloudy suspension. The zirconyl peroxide in 120 ml. volume is then added to the settled Chelex resin bed and mixed. After this addition the resin volume swells to about 80 ml. The reactants are occasionally mixed on a rotary shaker for 1 hr. The resin bed is allowed to settle and the fluid portion poured off. The resin is then repeatedly washed with distilled water. During this washing the settled resin volume again shrinks to about 50 ml.

EXAMPLE II

Determination of Properties of Zirconium Peroxide Resin

Several experiments were conducted to study the iodide oxidation characteristics of the zirconium peroxide resin and its ability to retain the oxidation product, elemental iodine. In all cases these experiments pertain to the zirconium peroxide resin prepared using the methanol procedure described in Example I. In these experiments, typically, a solution of potassium iodide at a given concentration is prepared and allowed to flow through a bed of the zirconium peroxide resin. The iodide and iodine concentrations of the input solution and effluent are measured using an iodide-selective electrode and a commercially available (Hach) DPD reagent, respectively. The general result is that iodide is substantially oxidized to iodine but very little iodine is released to solution. This iodine is retained in the gel matrix and can be observed to accumulate as the gel matrix changes color from a clear white to dark reddish-brown characteristic of elemental iodine. Representative data are set out below:

| Trial | Iodide Conc. mg/l (ppm) Input | Iodide Conc. mg/l (ppm) Output | Iodine Conc. mg/l (ppm) Input | Iodine Conc. mg/l (ppm) Output |
|---|---|---|---|---|
| 1 | 1270 | 127 | 0.0 | 1.5 |
| 2 | 12.7 | <0.127 | 0.0 | 0.0 |
| 3 | 1.27 | <0.00127 | 0.0 | 0.0 |

These data show that in the case of trial 1 where 1,270 ppm of iodide was oxidized to 1,143 ppm iodine (1,270–127) only 1.5 ppm was contained in the resin eluate. This dramatically demonstrates the iodine capturing mechanism of the resin. Even at very low iodide concentrations, trials 2 and 3 respectively, there is significant iodide oxidizing capability. In these cases no iodine could be demonstrated in the eluates because its concentration and efficiency of capture in the resin was too great.

EXAMPLE III

Regeneration of Zirconium Peroxide Resin

A fifty ml lot of zirconium peroxide resin was placed in a graduated cylinder with a ground glass stopper. Approximately 50 ml of KI solution (0.10M) was added to the resin. Very quickly the iodide solution was oxidized to molecular iodine as evidence by a dramatic color change in both the resin bed and the aqueous supernatant. Both phases turned the color of a concentrated iodine solution.

The aqueous supernatant fluid was poured into an evaporating dish and the resin bed repeatedly (5 times) washed with acetone (25 ml aliquots). These acetone washes were also added to the same evaporating dish. The pooled aqueous-acetone washes tested strongly for oxidative iodine with cadmium iodide-linear starch reagent. After repeated washing the resin reverted to a pale yellow color, indicating substantial removal of the elemental iodine.

The resin was repeatedly washed with 50 ml aliquots of distilled water. The final wash was aspirated leaving only the 50 ml resin bed. To this resin was added 25 ml of 30% hydrogen peroxide ($H_2O_2$). During the subsequent 10 minutes evidence of chemical reaction was apparent as there was evolution of gas and some warming of the reaction mixture. Excess hydrogen peroxide was decanted and the resin again repeatedly washed with distilled water. Again, a KI solution (0.10M) was added to this resin and again there was strong evidence for oxidation of the KI solution to elemental iodine. Acetone washing again was repeated to extract iodine from the resin bed.

The foregoing regeneration procedure has been found repeatable for at least four regenerations. This finding leads to the following conclusions: 1) zirconium is strongly held to the Chelex 100 resin bed so that it survives and can function as a reversible oxidant on demand when converted to the zirconium peroxide form; and 2) while the oxidative capacity of a given quantity of zirconium peroxide resin can be exhausted by the addition of a suitable amount of an oxidizable species i.e. iodide ($I^-$), this oxidative capacity can be restored by treating the resin with hydrogen peroxide.

We claim:

1. Method of treating an aqueous solution containing iodide, comprising contacting said solution with porous granules composed of a polyvalent metal chelating resin having zirconium peroxide bound to the chelating groups thereof, said contacting oxidizes the iodide in said solution to iodine, separating the solution from the granules wherein the resulting iodine is retained within said granules after the separation.

2. Method of claim 1 in which said granules contain iminodiacetate polyvalent metal chelating groups.

3. The method of claims 1 or 2 in which the resin granules containing said iodine are contacted with an eluting solution for removal of the iodine, and thereafter said granules are contacted with aqueous hydrogen peroxide to regenerate the oxidizing capacity of the resin granules.

4. The method of preparing iodine from an aqueous solution containing iodide, comprising contacting said solution with porous granules composed of a polyvalent metal chelating resin having zirconium peroxide bound to the chelating groups thereof, said contacting oxidizes iodide to iodine, separating the solution from the granules while leaving the iodine within said granules, and thereafter recovering the iodine from said granules by solvent elution.

5. The method of claim 4 in which said granules contain iminodiacetate polyvalent metal chelating groups.

* * * * *